(12) United States Patent  
Biskeborn et al.

(10) Patent No.: US 8,130,461 B2  
(45) Date of Patent: Mar. 6, 2012

(54) SYSTEMS AND METHODS FOR COMPENSATING FOR CROSSTALK BETWEEN NEARBY WRITERS

(75) Inventors: Robert G. Biskeborn, San Jose, CA (US); Philipp Herget, San Jose, CA (US); Wayne I. Imaino, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 12/616,018

(22) Filed: Nov. 10, 2009

(65) Prior Publication Data

US 2011/0109988 A1  May 12, 2011

(51) Int. Cl.  
*G11B 15/12* (2006.01)

(52) U.S. Cl. .......................... 360/63; 360/60; 360/77.12

(58) Field of Classification Search .................. None  
See application file for complete search history.

(56) References Cited

U.S. PATENT DOCUMENTS

| | | | |
|---|---|---|---|
| 4,331,992 A | 5/1982 | Klein et al. | 360/124 |
| 4,525,753 A | 6/1985 | Shimeki et al. | 360/45 |
| 4,847,707 A * | 7/1989 | Matsuoka et al. | 360/64 |
| 4,965,681 A * | 10/1990 | Takimoto | 360/64 |
| 5,883,750 A | 3/1999 | Maurice et al. | 360/63 |
| 5,920,447 A | 7/1999 | Sakata et al. | 360/121 |
| 6,198,583 B1 | 3/2001 | Ohinata et al. | 360/46 |
| 6,252,736 B1 | 6/2001 | Mattison | 160/68 |

* cited by examiner

*Primary Examiner* — Jason Olson  
(74) *Attorney, Agent, or Firm* — Zilka-Kotab, PC

(57) ABSTRACT

A recording system controller according to one embodiment includes a controller capable of selecting a level of a current or voltage applied to a first writer during the creation of a magnetic transition based on a current in at least one nearby writer. A recording system controller according to another embodiment includes a controller capable of selecting a timing of a current change applied to a first writer based on a current in at least one nearby writer for compensating for an effect of crosstalk from the at least one nearby writer. A method according to yet another embodiment includes selecting a level of a current or voltage applied to a first writer or selecting a timing of a current change applied to the first writer based on a current in at least one nearby writer for compensating for an effect of crosstalk from the at least one nearby writer.

20 Claims, 5 Drawing Sheets

SYSTEMS AND METHODS FOR COMPENSATING FOR CROSSTALK BETWEEN NEARBY WRITERS

BACKGROUND

The present invention relates to writing information to magnetic media, and more particularly, this invention relates to compensating for crosstalk between nearby writers.

In magnetic storage systems, data is read from and written onto magnetic recording media utilizing magnetic transducers commonly. Data is written on the magnetic recording medium by moving a magnetic recording transducer to a position over the medium where the data is to be stored. The magnetic recording transducer then reverses the polarity of the magnetic field, creating a magnetic transition. These transition are used to encode data into the magnetic medium. Data is read from the medium by similarly positioning the magnetic read transducer and then sensing the magnetic field generated by the transition in the magnetic medium. Read and write operations may be independently synchronized with the movement of the medium to ensure that the data can he read from and written to the desired location on the media.

An important and continuing goal in the data storage industry is that of increasing the density of data stored on a medium. For magnetic storage systems such as tape- and disk-based storage, that goal has lead to increasing the track density on the recording medium, and decreasing the thickness of the magnetic medium. In tape storage systems, multiple tracks are written simultaneously using an array of transducers. To design this array, the environmental operating conditions of the drive must be considered to ensure that under the expansion and contraction of the tape medium all of the transducers remain on track. This ultimately places a limit on the span of the transducer array. As the track densities increase, the span must be reduced, which results in closer pitched elements. Additionally, the number of channels in tape systems generally increase over time. This further reduces the transducer pitch as all of the channels must fit into the same span.

However, as the spacing between the writers becomes small, crosstalk between write transducers occurs as magnetic flux from each writer affect the written pattern produced by its neighbors. The crosstalk causes a shift in the location of the magnetic transitions produced by the writers and results in a poor write quality.

It would be favorable to reduce or eliminate this crosstalk between nearby heads to improve writing operation efficiency and accuracy. However, conventional wisdom dictates that it is desirable to create each channel to operate independently of all other channels.

SUMMARY

A recording system controller according to one embodiment includes a controller capable of selecting a level of a current or voltage applied to a first writer during the creation of a magnetic transition based on a current in at least one nearby writer.

A recording system controller according to another embodiment includes a controller capable of selecting a timing of a current change applied to a first writer based on a current in at least one nearby writer for compensating for an effect of crosstalk from the at least one nearby writer.

A method according to yet another embodiment includes selecting a level of a current or voltage applied to a first writer or selecting a timing of a current change applied to the first writer based on a current in at least one nearby writer for compensating for an effect of crosstalk from the at least one nearby writer.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of tape-based storage systems, as well as operation and/or component parts thereof. Disclosed are several write driver designs which compensate for writer crosstalk.

In one general embodiment, a recording system controller comprises a controller capable of selecting a level of a current or voltage applied to a first writer based on a current in at least one nearby writer, e.g., for compensating for an effect of crosstalk from the at least one nearby writer.

In another general embodiment, a recording system controller comprises a controller capable of selecting a timing of a current change applied to a first writer based on a current in at least one nearby writer for compensating for an effect of crosstalk from the at least one nearby writer.

In another general embodiment, a method comprises selecting a level of a current or voltage applied to a first writer or selecting a timing of a current change applied to the first writer during the creation of a magnetic transition based on a current in at least one nearby writer for compensating for an effect of crosstalk from the at least one nearby writer.

Figure 1:
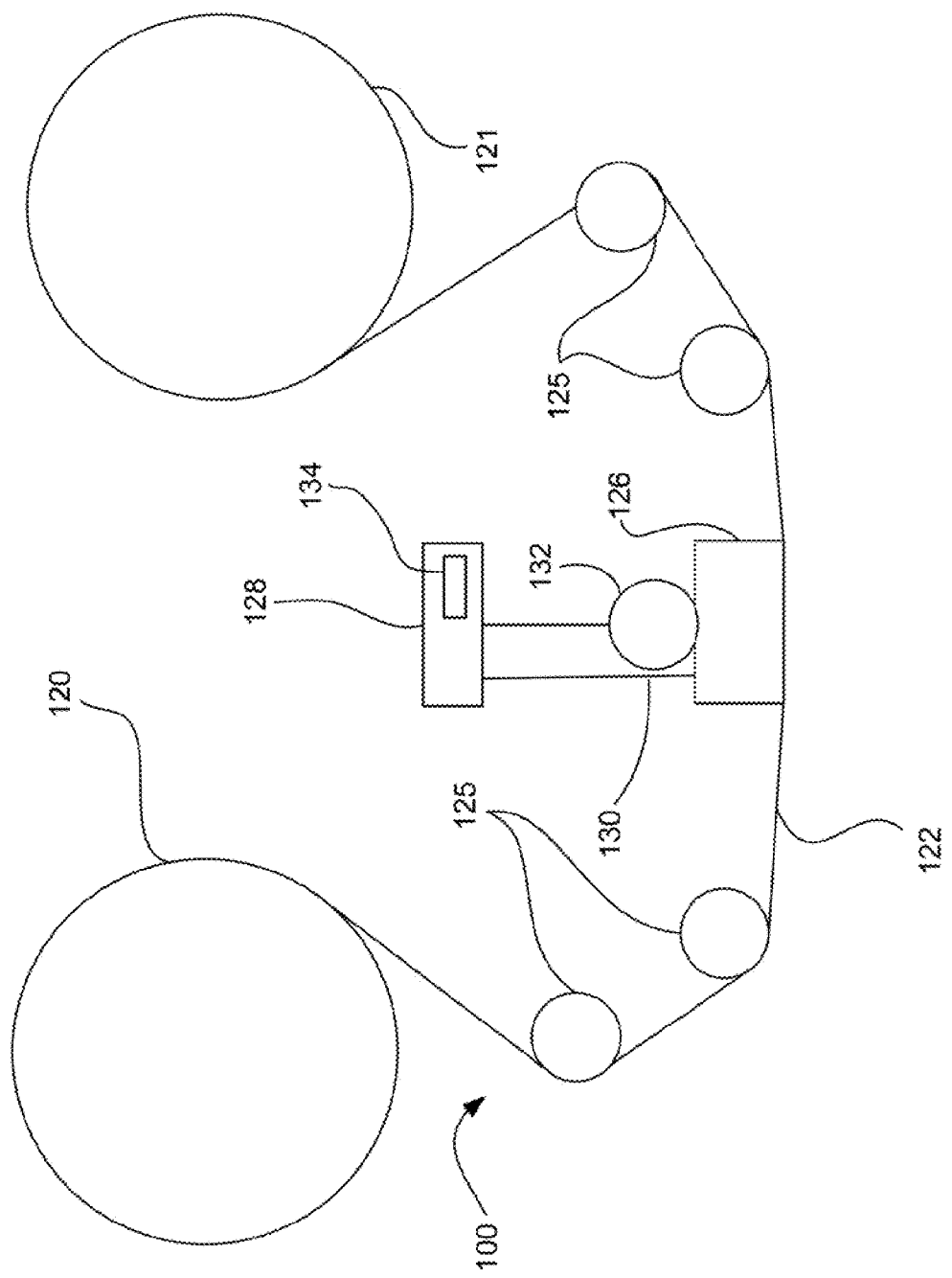
FIG. 1. is a schematic diagram of a simplified tape drive system according to one embodiment.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-tip reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive and a host (integral or external) to send and receive the data and for controlling the operation of the tape drive and communicating the status of the tape drive to the host, all as will be understood by those of skill in the art.

A tape drive system such as that shown in FIG. 1 may be comprised of a magnetic head 126 comprising a plurality of writers; a drive mechanism for passing a magnetic recording tape 122 over the head 126; a controller 128 coupled to the head 126. The writers in this or any other embodiment may be formed on a common substrate to reduce manufacturing steps and cost.

In another embodiment of the above mentioned system, the current may be reduced to about zero for one writer in a pair while the adjacent writer is switching.

Figure 2:
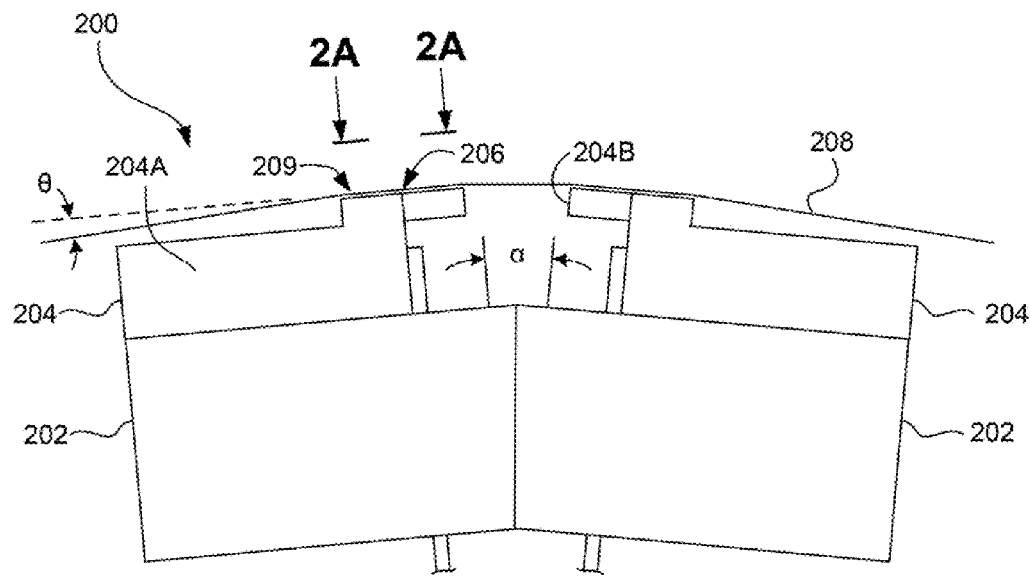
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases are typically "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between ⅛ degree and 4½ degrees.

The substrates 204A are typically constructed of a wear resistant material, such as a ceramic. The closures 204B made of the same or similar ceramic as the substrates 204A.

The readers and writers may be arranged in a piggyback configuration. The readers and writers may also be arranged in an interleaved configuration. Alternatively, each array of channels may be readers or writers only. Any of these arrays may contain one or more servo readers.

Figure 2A:
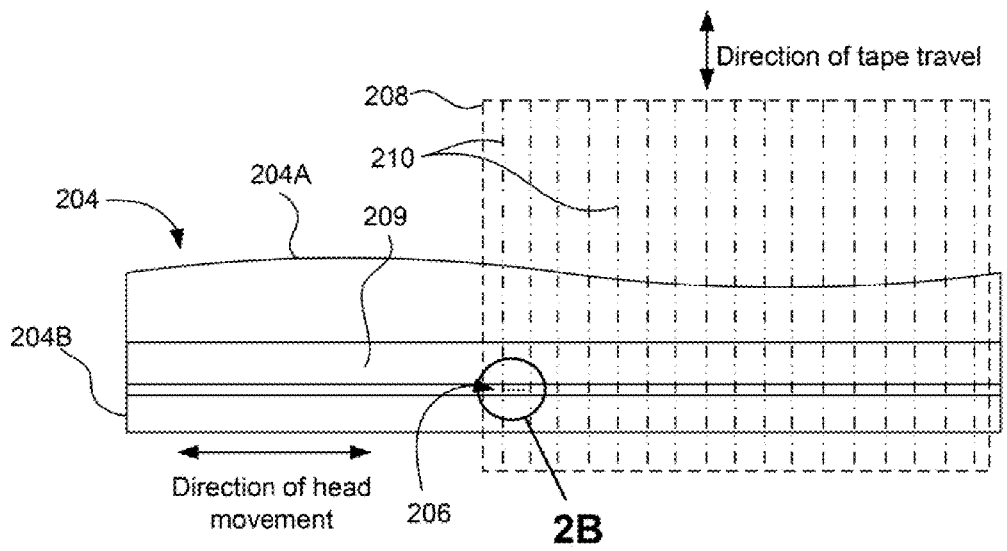
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 12-22 data bands, e.g., with 16 data bands and 17 servo tracks 210, as shown in FIG. 2A on a one-half inch wide tape 208. The data bands are defined between servo tracks 210. Each data band may include a number of data tracks, for example 96 data tracks (not shown). During read/write operations, the readers and/or writers 206 are positioned within one of the data bands. Outer readers, sometimes called servo readers, read the servo tracks 210. The servo signals are in turn used to keep the readers and/or writers 206 aligned with a particular track during the read/write operations.

Figure 2B:
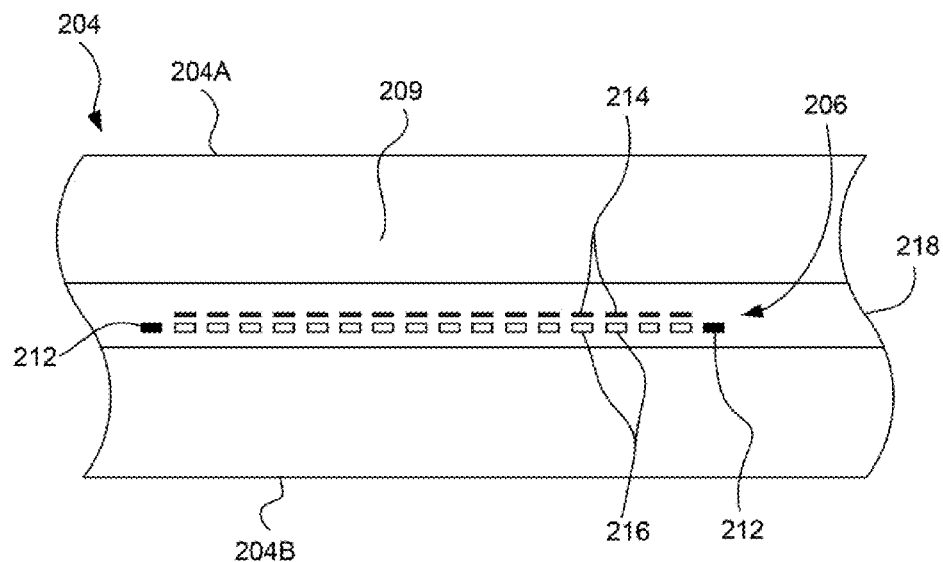
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, and 40 readers and/or writers per array 206. A preferred embodiment includes 32 readers per array and/or 32 writers per array. This allows the tape to travel more slowly, thereby reducing speed-induced tracking and mechanical difficulties. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
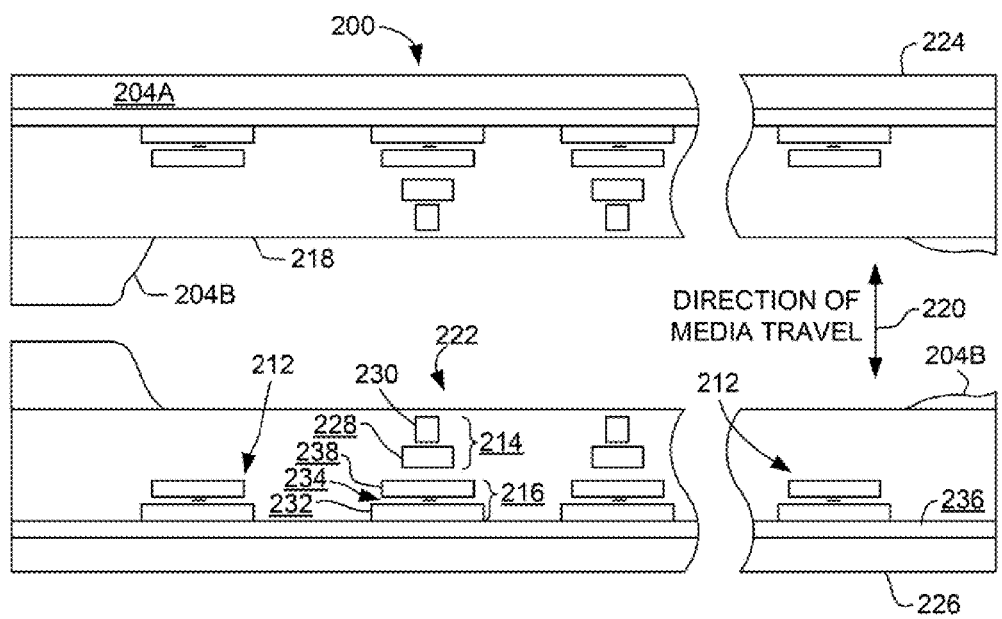
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form a R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function Of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Data is written on the magnetic recording medium by moving a magnetic recording transducer to a position over the medium where the data is to be stored. During a typical writing operation, the writers are continuously powered. At predefined locations on the tape corresponding to the particular data encoding being used, the current flowing through the writers is reversed thereby reversing the polarity of the magnetic field from the magnetic recording transducer, thereby creating a magnetic transition. These transitions are used to encode data into the magnetic medium.

Figure 3A:
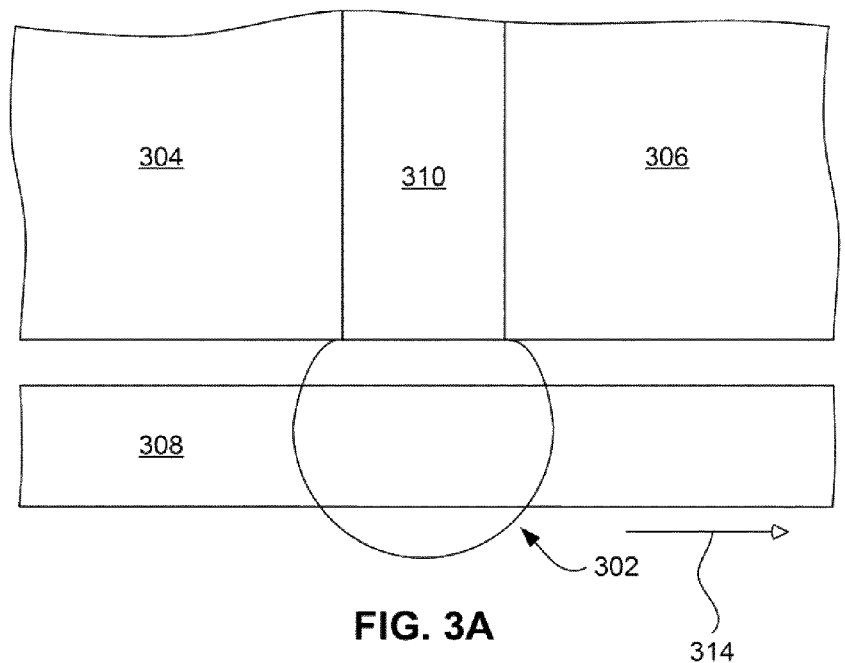
FIG. 3A is a schematic diagram of a write bubble.
Figure 3B:
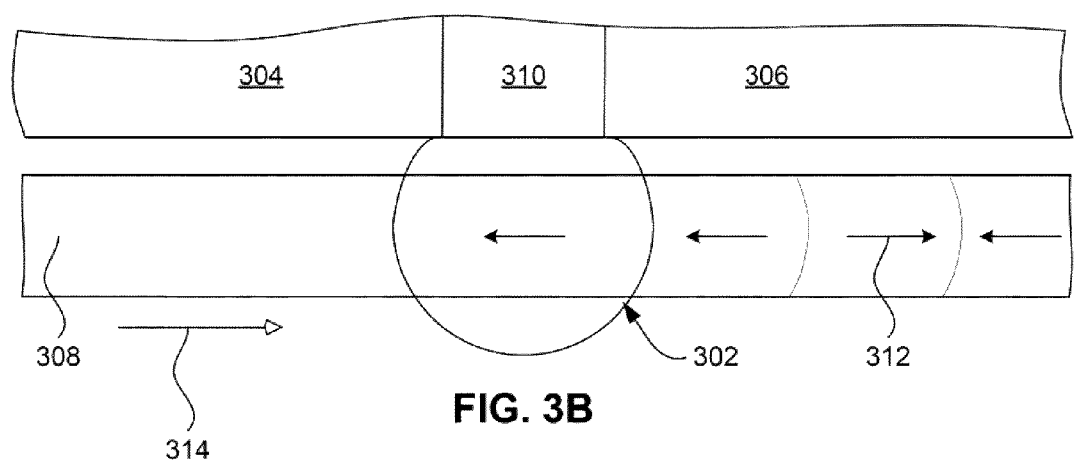
FIG. 3B is a schematic diagram of transitions on magnetic media.

FIGS. 3A-B illustrate how transitions are created by the writer during the recording process. With reference to FIG. 3A, when a writer is on, the magnetization of the medium 308 is altered under the writer in an area known as the write bubble 302. If the writer is powered with a steady current, the medium becomes magnetized in one direction as it moves underneath the head. The arrow 314 indicates that the medium 308 is moving relative to the writer. To create transitions, the polarity of the current in the writer is altered as the medium moves underneath the head. The data to be stored on the medium is encoded as a sequence of these transitions.

When two (or more) writers are placed in proximity to one another, crosstalk between the writers can be observed. Experimentally it has been found that the crosstalk manifests itself as a shift in the written transition location when the neighboring writer is in a DC current state. The direction of the transition shift is determined by the direction of current flow in the neighboring writer. In extreme cases, the shift may be so bad that the data is not readily recoverable.

The following embodiments include methodology, which may be incorporated in write driver designs, where the methodology compensates for writer crosstalk directly. In various embodiments, the current or voltage sent to a writer is altered based on the current in the nearby writer(s). This results in a modification of the write bubble size which in turn shifts the transition back to the desired location.

In one general method for compensating for crosstalk, a level of a current (e.g., its amplitude) or voltage applied to a first writer during the creation of a magnetic transition is altered, or a timing of a current change applied to the first writer during the creation of a magnetic transition is altered, based on a current in at least one nearby writer for compensating for an effect of crosstalk from the at least one nearby writer. Typically, the controller knows the state of the current because it is writing the data. By nearby, what is meant is that the writers are generally within range of the first writer to cause crosstalk on the first writer. Thus, the nearby writers may be in the same array, on a common substrate, etc. In general, the closer the writers are, the more pronounced the crosstalk will be. Thus, the methodology presented herein may apply to adjacent writers only, adjacent writer and their immediate neighbors, or more writers.

For simplicity, alteration of the current of the writers will be primarily discussed, it being kept in mind that similar or the same effects may be obtained by selecting the write voltages.

In one approach, the alteration of the write current or voltage of the first writer alters a size of a write bubble of the first writer, relative to the write bubble that would be formed by the first writer without alteration and under the effect of the crosstalk.

Figure 4:
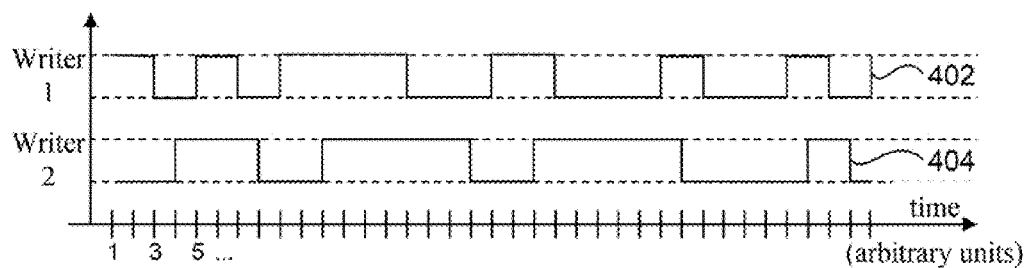
FIG. 4 is a diagram of current versus time for Writer 1 and Writer 2 without crosstalk compensation present.
Figure 5:
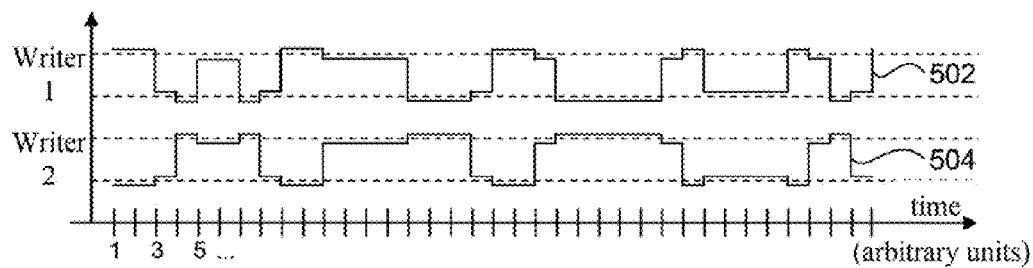
FIG. 5 is a diagram of current versus time for Writer 1 and Writer 2 with one example of crosstalk compensation.

Accordingly, in one embodiment, a write driver may compensate for crosstalk by selecting the amplitude of the voltage (or current) used for recording based on the current in the neighboring writer(s). In this embodiment the size of the write bubble is modulated directly to introduce a shift in the transition location during the creation of the transition, thus compensating for crosstalk. FIGS. 4 and 5 provide an illustration of one way in which this can be implemented. FIG. 4 shows a set of current waveforms 402, 404 on two writers without crosstalk compensation present, and FIG. 5 shows the waveforms 502, 504 with one example of crosstalk compensation. As shown in FIG. 5, the current in each writer is modulated by a small amount to compensate for the crosstalk. The modulation is based on the DC current state of the other writer.

In the shown approach, the current applied to the first writer is selectively altered upon a change in polarity of the current applied to the nearby writer(s). In FIG. 5, when Writer 2 is in a negative current state, a small positive offset is added to the current in Writer 1. When Writer 2 is in a positive current state, the polarity of the offset is reversed. This offset scheme is applied to each writer with respect to the neighboring writers. FIG. 5 shows a two writer scenario, so the current in each writer is shifted from the nominal. The current of Writer 1 goes from positive to negative current at t=3. To compensate for crosstalk, the current applied to Writer 2 is increased above the nominal level at t=3, and the increase is maintained while the current in Writer 1 is negative. Likewise, at t=4, the current applied to Writer 2 goes positive, and the current applied to Writer 1 is slightly lowered to compensate for the change in state of Writer 2.

In the scenario depicted in FIG. 5, there are only two writers each with one neighbor and thus two states are used to compensate for the crosstalk. This technique can be extended to compensate any number of writers having any number of neighboring writers generating crosstalk. In cases of more than one crosstalk generating neighbor, additional levels of voltage may be used for compensation.

It is also clear that the magnitude of the shift can be adjusted as needed to compensate for the crosstalk as expected from the physics of the writer structures, layout, and materials. Additionally, the alterations in the current applied to each writer need not be concurrent with the change in polarity of the nearby writer(s). it must simply be of the magnitude, polarity, and timing necessary to minimize the negative effects of crosstalk.

Note that there may be instances where the crosstalk from nearby writers is negligible. For example, this might occur if the currents in the nearby writer is at zero. This might also occur if the net effect of the crosstalk from multiple nearby writers is known to be negligible, e.g., because the crosstalk cancels itself out. In such case, the current applied to a writer may not be further altered if a state of the current in the writer corresponds to negligible net crosstalk applied to the first writer until the first writer writes a new transition.

In further embodiments, the current or voltage applied to the first writer is selectively altered during writing of a transition by the first writer. In one example, the write driver applies current or voltage compensation, but limits the compensation to only occur at the time during which the transition is being written. Unlike the aforementioned embodiment described with reference to FIG. 5, this illustrative method may result in only two steady state values for the head current. Thus, when one head is in a DC state while the neighbor is switching, the amount of crosstalk generated by that one head is restricted to one of two values. In a further example, a current in the first writer may be altered when a change in the state of one or more other writers creates a change in the magnetic fields in the first writer.

Figure 6:
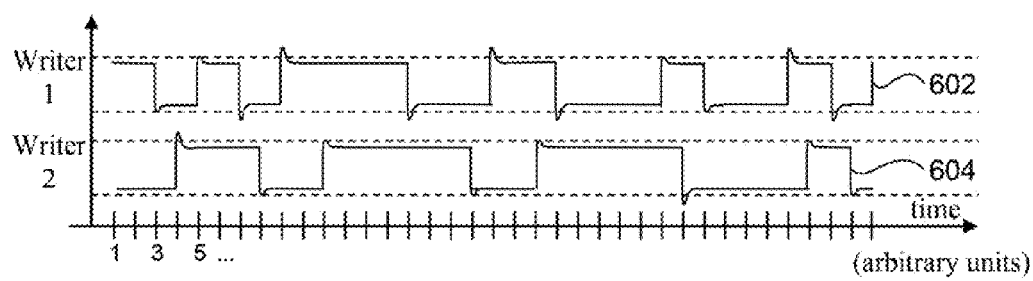
FIG. 6 is a diagram of current versus time for Writer 1 and Writer 2 with another example of crosstalk compensation.

Reference is again made to FIG. 4, which shows a set of current waveforms 402, 404 on two writers without crosstalk compensation present. FIG. 6 shows the waveforms 602, 604 with one example of crosstalk compensation. As shown, the current applied to each writer is altered to include an overshoot. For a write driver which produces an overshoot during switching, the written transition shape and location on the medium depend on the amplitude and shape of the overshoot. In this case, the crosstalk compensation may also be applied by selecting the overshoot characteristics, such as their amplitude and/or shape. In one approach, this may be implemented by increasing the initial voltage as stated above, but other methods, such as altering the driver output impedance may also be possible. Note that two distinct amount of overshoot are present in the waveforms to compensate for the crosstalk produced by the one neighboring writer in FIG. 6. The amount of overshoot may be dependent upon the state of any nearby writers producing crosstalk. The overshoot may also be modified to include a case with no overshoot, or a case with undershoot to control the transition location.

In another embodiment, the timing of each polarity reversal of the writer may be altered based on the current in the neighboring writer(s). In this embodiment the timing change shifts the transition in time to compensate for the crosstalk. To correctly compensate for the shift in position, the timing adjustment would also need to take into account the velocity of the medium and the crosstalk from any relevant neighboring writers.

In one general method for compensating for crosstalk, a velocity of the magnetic medium may be determined. For example, lithe controller instructs the motor subsystem to move the tape at 5 m/s, it has already determined the velocity. Also, the state of the current applied to at least one nearby writer is determined. Again, because the controller is controlling the writing, it may have already determined the state of the current. Moreover, a timing of a current or voltage change applied to a first writer is altered based on a current in the nearby writer(s) and, optionally the velocity of the medium, for compensating for an effect of crosstalk from the nearby writer(s).

In one approach, the timing of the current change applied to the first writer is set to a default timing (e.g., a normal timing, predefined default timing, etc.) if a state of the current in the at least one nearby writer corresponds to negligible net crosstalk applied to the first writer. For example, this might occur if the current in the nearby writer is at zero. This might also occur if the net effect of the crosstalk from multiple nearby writers is known to be negligible, e.g., because the crosstalk cancels itself out.

It will also be clear to one skilled in the art that the methodology of the various embodiments of the present invention may suitably be embodied in a logic apparatus comprising logic to perform various steps of the methodology presented herein, and that such logic may comprise hardware components and/or firmware components. Particularly preferred embodiments implement an Application Specific integraged Circuit (ASIC).

It will be equally clear to one skilled in the art that the logic arrangement in various approaches may suitably be embodied in a logic apparatus comprising logic to perform various steps of the method, and that such logic may comprise components such as logic gates in, for example, a programmable logic array. Such a logic arrangement may further be embodied in enabling means or components for temporarily or permanently establishing logical structures in such an array using, for example, a virtual hardware descriptor language, which may be stored using fixed or transmittable carrier media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A recording system controller, comprising:
a controller capable of selecting a level of a current or voltage applied to a first writer during the creation of a magnetic transition by the first writer based on a current in at least one nearby writer.

2. The recording system controller as recited in claim 1, wherein the selecting is for compensating for an effect of crosstalk from the at least one nearby writer.

3. A recording system controller as recited in claim 1, wherein the currents are continuously applied to the writers, where the current applied to each writer is reversed at selected times for creating magnetic transitions in a magnetic layer of a magnetic medium.

4. A recording system controller as recited in claim 1, wherein the current or voltage selected for the first writer is applied about concurrently with a change in state of the at least one nearby writer.

5. A recording system controller as recited in claim 4, wherein the current applied to the first writer is selectively applied upon a change in state of the current applied to the at least one nearby writer.

6. A recording system controller as recited in claim 1, wherein the current or voltage applied to the first writer is not further altered until the first writer writes a new transition if a state of the current in the at least one nearby writer corresponds to negligible net crosstalk applied to the first writer.

7. A recording system controller as recited in claim 1, wherein the current in the first writer is altered when a change in the state of one or more other writers creates a change in the magnetic fields in the first writer.

8. A recording system controller as recited in claim 1, wherein the current or voltage applied to the first writer is selectively altered about during writing of a transition by the first writer.

9. A recording system controller as recited in claim 1, wherein the current applied to the first writer includes an overshoot.

10. A recording system controller as recited in claim 9, wherein a characteristic of the overshoot is altered for adjusting a characteristic of the transition.

11. A recording system controller as recited in claim 1, wherein the current applied to the first writer is only altered during writing of a transition by the first writer.

12. A recording system controller as recited in claim 1, wherein the writers are formed on a common substrate.

13. A magnetic recording system, comprising:
a magnetic head comprising a plurality of writers;
a drive mechanism for passing a magnetic recording medium over the head;
a controller as recited in claim 1.

14. A recording system controller, comprising:
a controller capable of selecting a timing of a current change applied to a first writer based on a current in at least one nearby writer for compensating for an effect of crosstalk from the at least one nearby writer, wherein the currents are continuously applied to the writers.

15. A recording system controller as recited in claim 14, wherein the selecting is also dependent on a velocity of a magnetic medium.

16. A recording system controller as recited in claim 14, where the current applied to each writer is reversed at selected times for creating magnetic transitions in a magnetic layer of a magnetic medium, wherein the timing of the reversing of the current applied to the first writer is selected.

17. A recording system controller as recited in claim 14, wherein the timing of the current change applied to the first writer is set to a default timing if a state of the current in the at least one nearby writer corresponds to negligible net crosstalk applied to the first writer.

18. A recording system controller as recited in claim 14, wherein the writers are formed on a common substrate.

19. A magnetic recording system, comprising:
a magnetic head comprising a plurality of writers;
a drive mechanism for passing a magnetic recording medium over the head;
a controller as recited in claim 14.

20. A method, comprising:
selecting a level of a current or voltage applied to a first writer or selecting a timing of a current change applied to the first writer based on a current in at least one nearby writer for compensating for an effect of crosstalk from the at least one nearby writer, wherein the currents are continuously applied to the writers, where the current applied to each writer is reversed at selected times for creating magnetic transitions in a magnetic layer of a magnetic medium.

\* \* \* \* \*